United States Patent
Jang

(10) Patent No.: US 9,013,503 B2
(45) Date of Patent: Apr. 21, 2015

(54) IMAGE-DATA-CONVERTING DEVICE AND DISPLAY DEVICE INCLUDING THE SAME

(71) Applicant: Samsung Display Co., Ltd., Yongin-si, Gyeonggi-do (KR)

(72) Inventor: Won-Woo Jang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 225 days.

(21) Appl. No.: 13/727,577

(22) Filed: Dec. 26, 2012

(65) Prior Publication Data

US 2014/0063041 A1 Mar. 6, 2014

(30) Foreign Application Priority Data

Aug. 31, 2012 (KR) .................. 10-2012-0096609

(51) Int. Cl.

| G09G 5/00 | (2006.01) |
|---|---|
| G09G 5/02 | (2006.01) |
| G09G 1/28 | (2006.01) |
| G09G 5/10 | (2006.01) |
| G06K 9/00 | (2006.01) |
| G06K 9/40 | (2006.01) |
| G03F 3/08 | (2006.01) |
| H04N 5/202 | (2006.01) |
| H04N 9/64 | (2006.01) |
| H04N 5/21 | (2006.01) |

(52) U.S. Cl.
CPC ............... G09G 5/02 (2013.01); H04N 1/6058 (2013.01); G06T 11/001 (2013.01)

(58) Field of Classification Search
USPC ......... 345/589–590, 591, 600–601, 604, 606, 345/443, 690, 22; 348/254, 256, 277, 552, 348/557, 560, 571, 577, 599, 612, 630, 348/708; 358/518–520, 525; 382/162, 382/166–167, 254, 274, 276
See application file for complete search history.

(56) References Cited

U.S. PATENT DOCUMENTS

2007/0296988 A1 * 12/2007 Tsuji ............................. 358/1.9
2008/0056565 A1 *  3/2008 Minamino ................... 382/162
(Continued)

FOREIGN PATENT DOCUMENTS

| JP | 2012-044673 A | 3/2012 |
|---|---|---|
| KR | 10-2003-0073834 A | 9/2003 |

(Continued)

*Primary Examiner* — Wesner Sajous

(74) *Attorney, Agent, or Firm* — Christie, Parker & Hale, LLP

(57) ABSTRACT

A device includes converters for converting first image data of an RGB-type into second image data of a YCbCr-type, into third image data of the YCbCr-type, and into fourth image data of the RGB-type, wherein a CbCr-coordinate system has six regions defined by coordinates of a reference color and of six primary colors, and when coordinates of the second image data are located in a region defined by coordinates of the reference color, a first primary color, and a second primary color, the coordinates of the second image data are determined by the coordinates of the reference color, the first primary color, the second primary color, coordinates of a target reference color corresponding to those of the reference color, coordinates of a first target primary color corresponding to those of the first primary color, and coordinates of a second target primary color corresponding to those of the second primary color.

20 Claims, 9 Drawing Sheets

(56) References Cited

U.S. PATENT DOCUMENTS

2009/0154798 A1* 6/2009 Mizukura et al. ............ 382/162
2009/0154803 A1* 6/2009 Mizukura et al. ............ 382/166

FOREIGN PATENT DOCUMENTS

| KR | 10-2005-0049007 A | 5/2005 |
| KR | 10-2006-0071576 A | 6/2006 |

\* cited by examiner

IMAGE-DATA-CONVERTING DEVICE AND DISPLAY DEVICE INCLUDING THE SAME

CROSS-REFERENCE TO RELATED APPLICATION

This application claims priority to and the benefit of Korean Patent Application No. 10-2012-0096609 filed on Aug. 31, 2012 in the Korean Intellectual Property Office, the disclosure of which is incorporated herein by reference in its entirety.

BACKGROUND

1. Field

Embodiments of the present invention relate to an image-data-converting device and a display device including the same.

2. Description of the Related Art

A display device may include a display panel that can display an image corresponding to input image data. There are various types of display panels including liquid crystal display panels, organic electroluminescent display panels, electrophoretic display panels, and plasma display panels. Even when display panels are manufactured by the same process, they may be different in their characteristics. Due to differences in characteristics, different display panels that are manufactured by the same process may display images of different colors despite receiving the same image data. That is, there may be differences in color reproducibility between the display panels.

Therefore, the differences in color reproducibility between the display panels should be compensated, so that each display panel can display a desired color. To this end, image data needs to be converted for each display panel.

SUMMARY

Aspects of embodiments of the present invention provide an image-data-converting device that can compensate for differences in color reproducibility between display panels, and a display device including the image-data-converting device.

Aspects of embodiments of the present invention also provide an image-data-converting device that can convert image data to compensate for a difference in color reproducibility between display panels and a display device including the image-data-converting device.

However, aspects of embodiments of the present invention are not limited to those set forth herein. The above and other aspects of embodiments of the present invention will become more apparent to one of ordinary skill in the art to which the embodiments of the present invention pertain by referencing the detailed description given below.

According to an aspect of the present invention, there is provided a device including a first converter for converting first image data of an RGB-type into second image data of a YCbCr-type, a second converter for converting the second image data into third image data of the YCbCr-type, and a third converter for converting the third image data into fourth image data of the RGB-type, wherein a CbCr-coordinate system having an X-axis corresponding to a Cb value and a Y-axis corresponding to a Cr value is divided into six regions by straight lines respectively extending from coordinates of a reference color to coordinates of six primary colors arranged in a clockwise direction around the coordinates of the reference color, the six primary colors comprising a first primary color and a second primary color successively arranged in the clockwise direction with respect to the coordinates of the reference color, and wherein when coordinates of the second image data are located in a region having a boundary defined by straight lines respectively extending from the coordinates of the reference color to coordinates of the first primary color and to the coordinates of the second primary color, the coordinates of the second image data are determined by the coordinates of the reference color, the coordinates of the first primary color, the coordinates of the second primary color, coordinates of a target reference color corresponding to the coordinates of the reference color, coordinates of a first target primary color corresponding to the coordinates of the first primary color, and coordinates of a second target primary color corresponding to the coordinates of the second primary color.

The device may further include a memory for storing the coordinates of the first and second primary colors, the coordinates of the first and second target primary colors, and the coordinates of the target reference color.

The reference color may be white, and wherein the six primary colors may include red, magenta, blue, cyan, green, and yellow.

When the coordinates of the second image data are the same as the coordinates of the reference color, the coordinates of the third image data may be the same as the coordinates of the target reference color.

When the coordinates of the second image data are the same as the coordinates of the first primary color, the coordinates of the third image data may be the same as the coordinates of the first target primary color.

When the coordinates of the second image data are located on a straight line extending from the coordinates of the reference color to the coordinates of the first primary color, a ratio of a second distance between the coordinates of the second image data and the coordinates of the reference color to a first distance between the coordinates of the second image data and the coordinates of the first primary color may be equal to a ratio of a fourth distance between the coordinates of the third image data and the coordinates of the target reference color to a third distance between the coordinates of the third image data and the coordinates of the first target primary color.

When coordinates of the second image data are (Cb1, Cr1), when coordinates of the third image data are (Cb2, Cr2), when a displacement from the coordinates of the target reference color to the coordinates of the first target primary color on a Cb-axis is DCb1, when a displacement from the coordinates of the target reference color to the coordinates of the first target primary color on a Cr-axis is DCr1, when a displacement from the coordinates of the target reference color to the coordinates of the second target primary color on the Cb-axis is DCb2, when a displacement from the coordinates of the target reference color to the coordinates of the second target primary color on the Cr-axis is DCr2, when sc1 and sc2 are first and second scaling factors, respectively, and when the coordinates of the second image data are located in the region having a boundary defined by straight lines respectively extending from the coordinates of the reference color to the coordinates of the first primary color and to the coordinates of the second primary color, Cb2 may equal Cb1*(DCb1+DCb2)*sc1, and Cr2 may equal Cr1*(DCr1+DCr2)*sc2.

When the coordinates of the first target primary color are (CbT1, CrT1), when the coordinates of the second target primary color are (CbT2, CrT2), when the coordinates of the first primary color are (CbO1, CrO1), and when the coordinates of the target reference color are (CbST, CrST), sc1 may equal |CbT1/[Cb01*(CbT1+CbT2−2CbST)]|, and sc2 may equal |CrT1/[Cb01*(CrT1+CrT2−2CrST)]|.

When he coordinates of the first target primary color are (CbT1, CrT1), when the coordinates of the second target primary color are (CbT2, CrT2), when the coordinates of the second primary color are (CbO2, CrO2), and when the coordinates of the target reference color are (CbST, CrST), sc1 may equal |CbT1/[CbO1*(CbT1+CbT2−2CbST)]|, and sc2 may equal |CrT1/[CrO1*(CrT1+CrT2−2CrST)]|.

According to another aspect of the present invention, there is provided a display device including an image data converter for converting first image data of an RGB-type into fourth image data of the RGB-type, the image data converter including a first converter for converting the first image data of the RGB-type into second image data of a YCbCr-type, a second converter for converting the second image data into third image data of the YCbCr-type, and a third converter for converting the third image data into the fourth image data of the RGB-type, a display panel for displaying an image corresponding to the fourth image data, wherein a CbCr-coordinate system having an X-axis corresponding to a Cb value and a Y-axis corresponding to a Cr value is divided into six regions respectively defined by straight lines respectively extending from coordinates of a reference color to coordinates of six primary colors arranged in a clockwise direction around the coordinates of the reference color, wherein the six primary colors comprise a first primary color and a second primary color successively arranged in the clockwise direction with respect to the coordinates of the reference color, and wherein when coordinates of the second image data are located in a region having a boundary defined by straight lines respectively extending from the coordinates of the reference color to coordinates of the first primary color and to the coordinates of the second primary color, the coordinates of the second image data are determined by: the coordinates of the reference color; the coordinates of the first primary color; the coordinates of the second primary color; coordinates of a target reference color corresponding to the coordinates of the reference color; coordinates of a first target primary color corresponding to the coordinates of the first primary color; and coordinates of a second target primary color corresponding to the coordinates of the second primary color.

When the coordinates of the second image data are (Cb1, Cr1), when coordinates of the third image data are (Cb2, Cr2), when a displacement from the coordinates of the target reference color to the coordinates of the first target primary color on a Cb-axis is DCb1, when a displacement from the coordinates of the target reference color to the coordinates of the first target primary color on a Cr-axis is DCr1, when a displacement from the coordinates of the target reference color to the coordinates of the second target primary color on the Cb-axis is DCb2, when a displacement from the coordinates of the target reference color to the coordinates of the second target primary color on the Cr-axis is DCr2, when sc1 and sc2 are first and second scaling factors, respectively, and when the coordinates of the second image data are located in the region having a boundary defined by the straight lines respectively extending from the coordinates of the reference color to the coordinates of the first primary color and to the coordinates of the second primary color, Cb2 may equal Cb1*(DCb1+DCb2)*sc1, and Cr2 may equal Cr1*(DCr1+DCr2)*sc2.

When the coordinates of the first target primary color are (CbT1, CrT1), when the coordinates of the second target primary color are (CbT2, CrT2), when the coordinates of the first primary color are (CbO1, CrO1), and when the coordinates of the target reference color are (CbST, CrST), sc1 may equal |CbT1/[Cb01*(CbT1+CbT2−2CbST)]|, and sc2 may equal |CrT1/[Cb01*(CrT1+CrT2−2CrST)]|.

When the coordinates of the second image data are the same as the coordinates of the reference color, the coordinates of the third image data may be the same as the coordinates of the target reference color.

When the coordinates of the second image data are the same as the coordinates of the first primary color, the coordinates of the third image data may be the same as the coordinates of the first target primary color.

When the coordinates of the second image data are located on a straight line extending from the coordinates of the reference color to the coordinates of the first primary color, a ratio of a second distance between the coordinates of the second image data and the coordinates of the reference color to a first distance between the coordinates of the second image data and the coordinates of the first primary color may be equal to a ratio of a fourth distance between the coordinates of the third image data and the coordinates of the target reference color to a third distance between the coordinates of the third image data and the coordinates of the first target primary color.

The display device may further include a memory for storing the coordinates of the first and second primary colors, the coordinates of the first and second target primary colors, and the coordinates of the target reference color.

The reference color may be white, and wherein the six primary colors may include red, magenta, blue, cyan, green, and yellow.

When the coordinates of the first target primary color are (CbT1, CrT1), when the coordinates of the second target primary color are (CbT2, CrT2), when the coordinates of the second primary color are (CbO2, CrO2), and when the coordinates of the target reference color are (CbST, CrST), sc1 may equal |CbT1/[CbO1*(CbT1+CbT2−2CbST)]|, and sc2 may equal |CrT1/[CrO1*(CrT1+CrT2−2CrST)]|.

When coordinates of YCbCr-type data into which the fourth image data is converted are the same as the coordinates of the first target primary color in the CbCr-coordinate system, the display panel may display the first primary color.

When the coordinates of the third image data of the YCbCr-type into which the fourth image data is converted are the same as the coordinates of the target reference color, the display panel may display the reference color.

BRIEF DESCRIPTION OF THE DRAWINGS

The above and other aspects of embodiments of the present invention will become more apparent by describing in detail exemplary embodiments thereof with reference to the attached drawings, in which.

DETAILED DESCRIPTION

Figure 1:
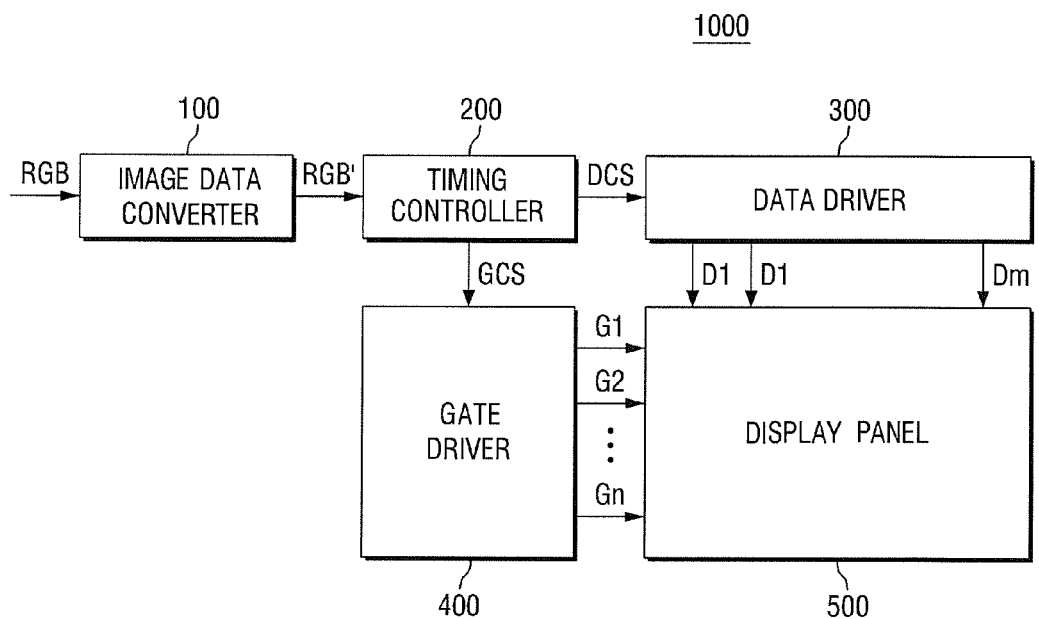
FIG. 1 is a block diagram of a display device according to an embodiment of the present invention.

Aspects of embodiments of the present invention, and methods of accomplishing the same, may be understood more readily by reference to the following detailed description of embodiments and the accompanying drawings. The present invention may, however, be embodied in many different forms, and should not be construed as being limited to the embodiments set forth herein. Rather, these embodiments are provided so this disclosure will be thorough and complete, and will fully convey the concept of the invention to those skilled in the art, and the present invention will only be defined by the appended claims and their equivalents. Thus, in some embodiments, well-known structures and devices are not shown to avoid obscuring the description with unnecessary detail. Like numbers refer to like elements throughout. In the drawings, the thickness of layers and regions are exaggerated for clarity.

It will be understood that, although the terms first, second, etc. may be used herein to describe various elements, these elements should not be limited by these terms. These terms are intended to distinguish one element from another element. Thus, for example, a first element, a first component, or a first section could be termed a second element, a second component, or a second section, without departing from the teachings of the present invention.

Embodiments of the present invention will now be described with reference to the attached drawings.

FIG. 1 is a block diagram of a display device 1000 according to an embodiment of the present invention. Referring to FIG. 1, the display device 1000 includes an image data converter 100 and a display panel 500.

The image data converter 100 may convert first image data RGB into fourth image data RGB'. The first image data RGB and the fourth image data RGB' may be RGB-type image data. That is, the first image data RGB and the fourth image data RGB' may store information about an image as red, green, and blue components.

The image data converter 100 may convert the first image data RGB into the fourth image data RGB' to compensate for differences in color reproducibility between the display panel 500 and other similarly produced display panels, as caused by physical differences between the display panels. Therefore, the display device 1000 can reduce differences in color reproducibility using the image data converter 100.

In FIG. 1, the image data converter 100 is located before a timing controller 200, which will be described later. However, the position of the image data converter 100 is not limited to this position. For example, the image data converter 100 can be between the timing controller 200 and a data driver 300, which will be described later, or can be placed within the timing controller 200.

According to embodiments of the present invention, the image data converter 100 may be formed as an image-data-converting device separate from the display device 100.

The image data converter 100 will be described in more detail later with reference to FIG. 2.

The display panel 500 may receive first through $m^{th}$ data signals D1 through Dm and first through $n^{th}$ gate signals G1 through Gn, and can display an image corresponding to the first through $m^{th}$ data signals D1 through Dm and the first through $n^{th}$ gate signals G1 through Gn. The first through $m^{th}$ data signals D1 through Dm may correspond to the fourth image data RGB'. That is, the display panel 500 may display an image corresponding to the fourth image data RGB'.

Different display panels may display images of different colors corresponding to same first through $m^{th}$ data signals D1 through Dm, because the display panels are different with respect to color reproducibility. To compensate for the difference in color reproducibility, the display device 1000 may include the image data converter 100 and may convert the first image data RGB into the fourth image data RGB' using the image data converter 100.

The display device 1000 may further include the timing controller 200, the data driver 300, and a gate driver 400.

The timing controller 200 may generate a data driver control signal DCS for controlling the data driver 300, and a gate driver control signal GCS for controlling the gate driver 400, based on the fourth image data RGB'.

The data driver 300 may receive the data driver control signal DCS and may generate the first through $m^{th}$ data signals D1 through Dm corresponding to the data driver control signal DCS.

The gate driver 400 may generate the first through $n^{th}$ gate signals G1 through Gn corresponding to the gate driver control signal GCS.

The image data converter 100 will now be described in more detail with reference to FIG. 2. FIG. 2 is a block diagram of an image data converter 100 according to an embodiment of the present invention. Referring to FIG. 2, the image data converter 100 includes a first converter 110, a second converter 120, and a third converter 130.

The first converter 110 may convert first image data RGB into second image data YCbCr. The second image data YCbCr may be YCbCr-type image data. That is, the second image data YCbCr may store information about an image as luminance Y, color difference Cb for blue, and color difference Cr for red. The first image data RGB and the second image data YCbCr may be of different types, but may represent the same image. The first image data RGB may be converted into the second image data YCbCr by, for example:

$Y=0.29900R+0.58700G+0.11400B;$ $Cb=-0.16874R-0.33126G+0.50000B,$ and $Cr=0.50000R-0.41869G-0.08131B.$ The second converter 120 converts the second image data YCbCr into third image data YCbCr'. The third image data YCbCr' may be YCbCr-type image data. A Y value of the third image data YCbCr' may be equal to that of the second image data YCbCr. However, Cb and Cr values of the third image data YCbCr' may be different from those of the second image data YCbCr. The second converter 120 may compensate for a difference in color reproducibility between the display panel 500 and another display panel caused by a difference between the display panels by converting the second image data YCbCr into the third image data YCbCr'. Converting the second image data YCbCr into the third image data YCbCr' will now be described in more detail with reference to FIGS. 3 through 11.

Figure 3:
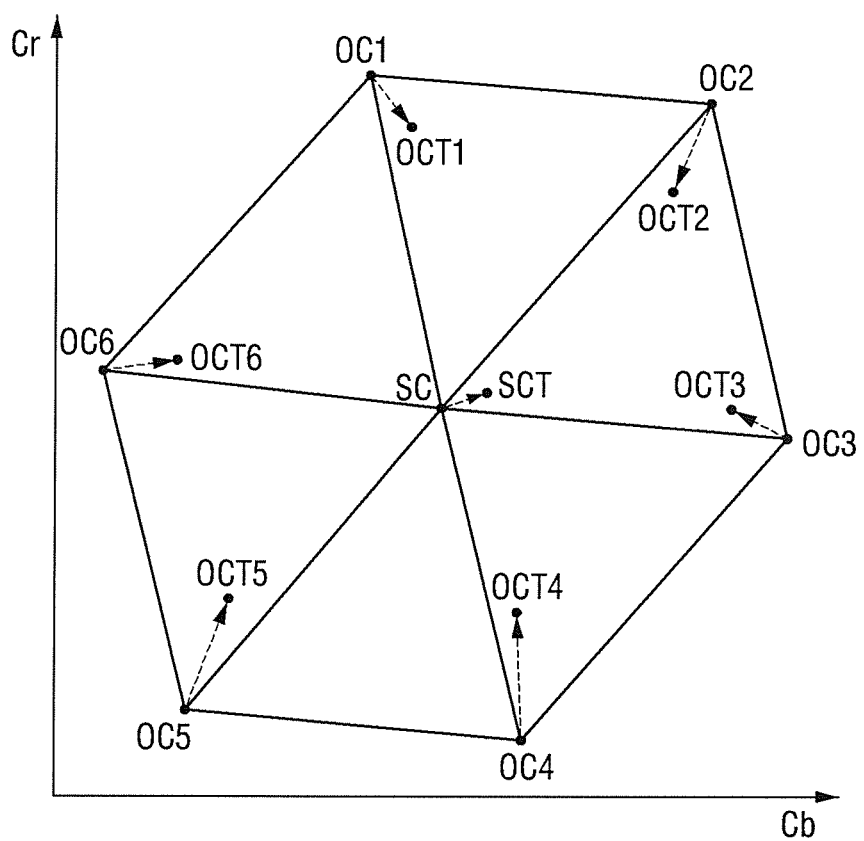
FIG. 3 is a diagram illustrating coordinates of a reference color, a target reference color, first through sixth primary colors, and first through sixth target primary colors in a CbCr-coordinate system, according to an embodiment of the present invention.

FIG. 3 is a diagram illustrating coordinates of a reference color SC, a target reference color SCT, first through sixth primary colors OC1 through OC6, and first through sixth target primary colors OCT1 through OCT 6 in a CbCr-coordinate system, according to an embodiment of the present invention. Referring to FIG. 3, the horizontal axis of the CbCr-coordinate system corresponds to the Cb value, and the vertical axis of the CbCr-coordinate system corresponds to the Cr value. The coordinates of the first through sixth primary colors OC1 through OC6 may be arranged, or sequentially ordered, in a clockwise direction around the coordinates of the reference color SC in the CbCr-coordinate system. The reference color SC may be a white color, and the first through sixth primary colors OC1 through OC6 may be red, magenta, blue, cyan, green, and yellow.

If coordinates of the second image data YCbCr are the coordinates of the first primary color OC1, the second converter 120 may convert the second image data YCbCr such that coordinates of the third image data YCbCr' become the coordinates of the first target primary color OCT1. If the coordinates of the second image data YCbCr are the coordinates of the second primary color OC2, the second converter 120 may convert the second image data YCbCr such that the coordinates of the third image data YCbCr' become the coordinates of the second target primary color OCT2. If the coordinates of the second image data YCbCr are the coordinates of any one of the third through sixth primary colors OC3 through OC6, the second converter 120 may convert the second image data YCbCr in the same way as described above when the coordinates of the second image data YCbCr are the coordinates of the first or second primary color OC1 or 0C2.

If the coordinates of the second image data YCbCr are the coordinates of the reference color SC, the second converter 120 may convert the second image data YCbCr such that the coordinates of the third image data YCbCr' become the coordinates of the target reference color SCT.

Image data provided to the timing controller 200 may undergo changes. Thus, the coordinates of the first target primary color OCT1 may be determined by the image data at a time when the display panel 100 displays the first primary color OC1. The coordinates of the second through sixth target primary colors OCT2 through OCT6 and the coordinates of the target reference color SCT may also be determined using substantially the same method as the method mentioned above.

Figure 4:
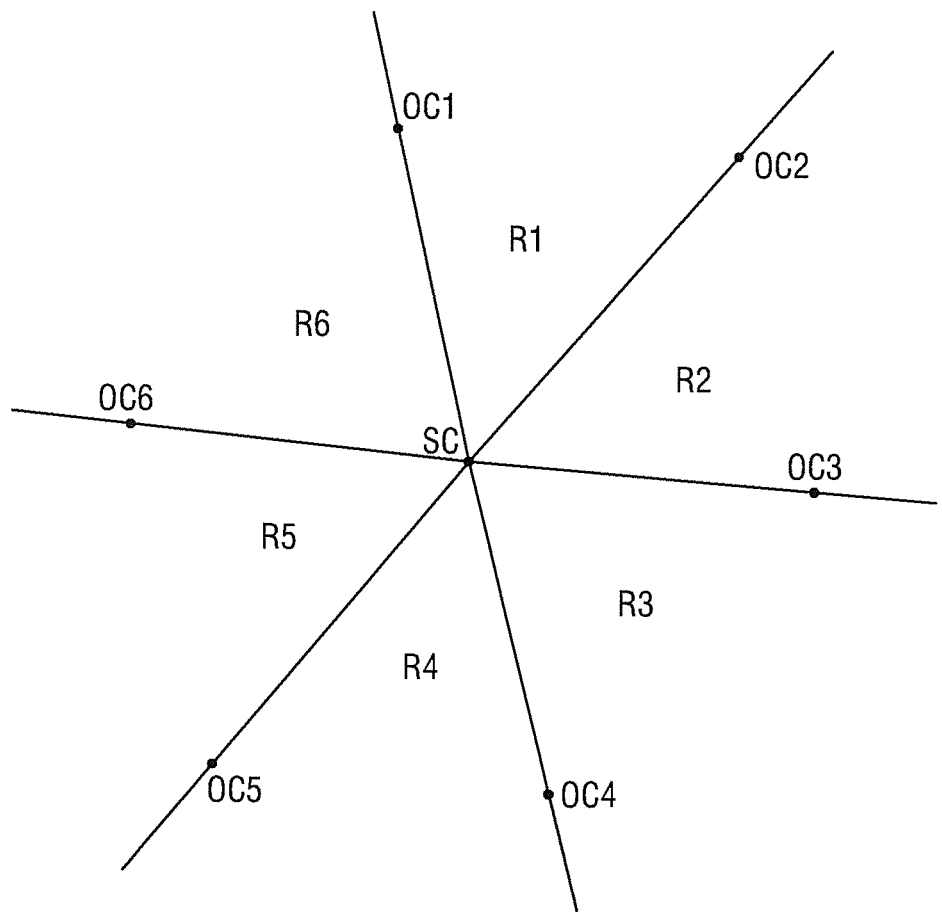
FIG. 4 is a diagram illustrating first through sixth regions in the CbCr-coordinate system, according to an embodiment of the present invention.

FIG. 4 is a diagram illustrating first through sixth regions R1 through R6 in the CbCr-coordinate system according to an embodiment of the present invention. Referring to FIG. 4, the CbCr-coordinate system may be divided into the first through sixth regions R1 through R6. The CbCr-coordinate system may be divided into the first through sixth regions R1 through R6 by straight lines extending from the coordinates of the reference color SC to the coordinates of the first through sixth primary colors OC1 through OC6. That is, the boundary of the first region R1 may be defined by the straight lines extending from the coordinates of the reference color SC to the coordinates of the first primary color OC1 and to the coordinates of the second primary color OC2, respectively. The boundary of the second region R2 may be defined by the straight lines extending from the coordinates of the reference color SC to the coordinates of the second primary color OC2 and to the coordinates of the third primary color OC3, respectively. The boundary of the third region R3 may be defined by the straight lines extending from the coordinates of the reference color SC to the coordinates of the third primary color OC3 and to the coordinates of the fourth primary color OC4, respectively. The boundary of the fourth region R4 may be defined by the straight lines extending from the coordinates of the reference color SC to the coordinates of the fourth primary color OC4 and to the coordinates of the fifth primary color OC5, respectively. The boundary of the fifth region R5 may be defined by the straight lines extending from the coordinates of the reference color SC to the coordinates of the fifth primary color OC5 and to the coordinates of the sixth primary color OC6, respectively. And the boundary of the sixth region R6 may be defined by the straight lines extending from the coordinates of the reference color SC to the coordinates of the sixth primary color OC6 and to the coordinates of the first primary color OC1, respectively.

Figure 5:
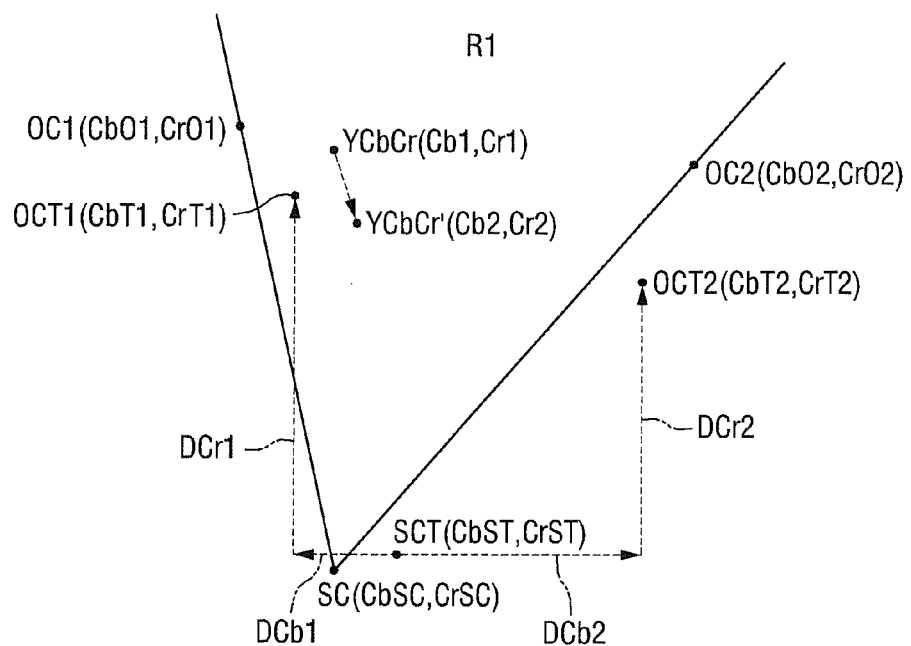
FIG. 5 is a diagram illustrating data conversion where coordinates of second image data are located in the first region of the CbCr-coordinate system, according to an embodiment of the present invention.

Data conversion where the coordinates of the second image data YCbCr are located in the first region R1 will now be described with reference to FIG. 5. FIG. 5 is a diagram illustrating data conversion where the coordinates of the second image data YCbCr are located in the first region R1 of the CbCr-coordinate system, according to an embodiment of the present invention.

Referring to FIG. 5, the second image data YCbCr may have coordinates of (Cb1, Cr1) in the CbCr-coordinate system, and (Cb1, Cr1) may be located in the first region R1. The second image data YCbCr is converted into the third image data YCbCr' having coordinates of (Cb2, Cr2). Cb2 and Cr2 may be respectively defined by Equations (1) and (2) below.

$Cb2 = Cb1 * (DCb1 + DCb2) * sc1$            Equation (1)

$Cr2 = Cr1 * (DCr1 + DCr2) * sc2$            Equation (2)

DCb1 may be a displacement (e.g., a measurement of displacement) from coordinates (CbST, CrST) of the target reference color SCT to coordinates (CbT1, CrT1) of the first target primary color OCT1 on the Cb axis. That is, DCb1=CbT1−CbST (e.g., the distance along the Cb axis between CbST and CbT1).

DCb2 may be a displacement from the coordinates (CbST, CrST) of the target reference color SCT to coordinates (CbT2, CrT2) of the second target primary color OCT2 on the Cb axis. That is, DCb2=CbT2−CbST.

DCr1 may be a displacement from the coordinates (CbST, CrST) of the target reference color SCT to the coordinates (CbT1, CrT1) of the first target primary color OCT1 on the Cr axis. That is, DCr1=CrT1−CrST.

DCr2 may be a displacement from the coordinates (CbST, CrST) of the target reference color SCT to the coordinates (CbT2, CrT2) of the second target primary color OCT2 on the Cr axis. That is, DCr2=CrT2−CrST.

In addition, sc1 and sc2 may be first and second scaling factors, respectively. According to some embodiments of the present invention, if the coordinates (Cb1, Cr1) of the second image data YCbCr are the same as coordinates (CbO1, CrO1) of the first primary color OC1, which are located in a counterclockwise direction of the first region R1 with respect to the coordinates (CbSC, CrSC) of the reference color SC, values of sc1 and sc2 may be determined such that the coordinates (Cb1, Cr1) of the second image data YCbCr are converted into the coordinates (CbT1, CrT1) of the first target primary color OCT1 by Equations (1) and (2). Accordingly, the values of sc1 and sc2 may be given by $$sc1=|CbT1/[CbO1*(CbT1+CbT2-2CbST)]|$$

$$sc2=|CrT1/[CrO1*(CrT1+CrT2-2CrST)]|.$$

According to other embodiments of the present invention, if the coordinates (Cb1, Cr1) of the second image data YCbCr are the same as coordinates (CbO2, CrO2) of the second primary color OC2, which are located in a clockwise direction of the first region R1 with respect to the coordinates (CbSC, CrSC) of the reference color SC, the values of sc1 and sc2 may be determined such that the coordinates (Cb1, Cr1) of the second image data YCbCr are converted into the coordinates (CbT2, CrT2) of the second target primary color OCT2 by Equations (1) and (2). The values of sc1 and sc2 may be given by $$sc1=|CbT2/[CbO2*(CbT1+CbT2-2CbST)]|$$

$$sc2=|CrT2/[CrO2*(CrT1+CrT2-2CrST)]|.$$

Figure 6:
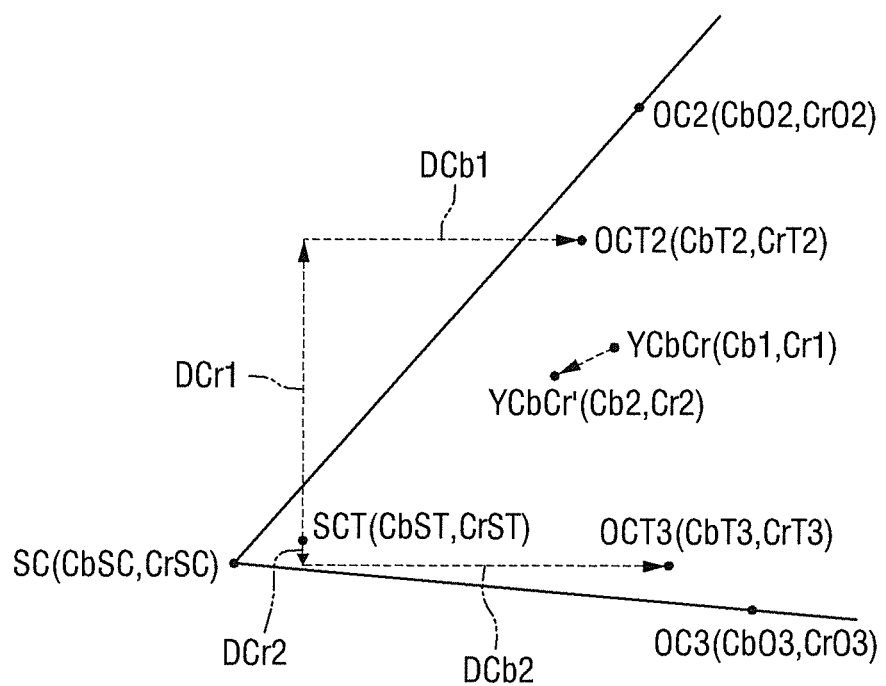
FIG. 6 is a diagram illustrating data conversion where the coordinates of the second image data are located in the second region of the CbCr-coordinate system, according to an embodiment of the present invention.

Data conversion where the coordinates of the second image data YCbCr are located in the second region R2 will now be described with reference to FIG. 6. FIG. 6 is a diagram illustrating data conversion where the coordinates of the second image data YCbCr are located in the second region R2 of the CbCr-coordinate system, according to an embodiment of the present invention.

Referring to FIG. 6, the second image data YCbCr may have coordinates of (Cb1, Cr1) in the CbCr-coordinate system, and (Cb1, Cr1) may be located in the second region R2. The second image data YCbCr is converted into the third image data YCbCr' having coordinates of (Cb2, Cr2). Cb2 and Cr2 may respectively correspond to Equations (1) and (2). Here, DCb1, DCb2, DCr1, DCr2, sc1, and sc2 may have different values from those in FIG. 5.

DCb1 may be a displacement from the coordinates (CbST, CrST) of the target reference color SCT to the coordinates (CbT2, CrT2) of the second target primary color OCT2 on the Cb axis. That is, DCb1=CbT2−CbST.

DCb2 may be a displacement from the coordinates (CbST, CrST) of the target reference color SCT to coordinates (CbT3, CrT3) of the third target primary color OCT3 on the Cb axis. That is, DCb2=CbT3−CbST.

DCr1 may be a displacement from the coordinates (CbST, CrST) of the target reference color SCT to the coordinates (CbT2, CrT2) of the second target primary color OCT2 on the Cr axis. That is, DCr1=CrT2−CrST.

DCr2 may be a displacement from the coordinates (CbST, CrST) of the target reference color SCT to the coordinates (CbT3, CrT3) of the third target primary color OCT3 on the Cr axis. That is, DCr2=CrT3−CrST.

In addition, sc1 and sc2 may be the first and second scaling factors, respectively. According to some embodiments of the present invention, if the coordinates (Cb1, Cr1) of the second image data YCbCr are the same as the coordinates (CbO2, CrO2) of the second primary color OC2, which are located in the counterclockwise direction of the second region R2 with respect to the coordinates (CbSC, CrSC) of the reference color SC, the values of sc1 and sc2 may be determined such that the coordinates (Cb1, Cr1) of the second image data YCbCr are converted into the coordinates (CbT2, CrT2) of the second target primary color OCT2 by Equations (1) and (2). The values of sc1 and sc2 may be given by $$sc1=|CbT2/[CbO2*(CbT2+CbT3-2CbST)]|$$

$$sc2=|CrT2/[CrO2*(CrT2+CrT3-2CrST)]|.$$

According to other embodiments of the present invention, if the coordinates (Cb1, Cr1) of the second image data YCbCr are the same as coordinates (CbO3, CrO3) of the third primary color OC3, which are located in the clockwise direction of the second region R2 with respect to the coordinates (CbSC, CrSC) of the reference color SC, the values of sc1 and sc2 may be determined such that the coordinates (Cb1, Cr1) of the second image data YCbCr are converted into the coordinates (CbT3, CrT3) of the third target primary color OCT3 by Equations (1) and (2). The values of sc1 and sc2 may be given by $$sc1=|CbT3/[CbO3*(CbT2+CbT3-2CbST)]|$$

$$sc2=|CrT3/[CrO3*(CrT2+CrT3-2CrST)]|.$$

Figure 7:
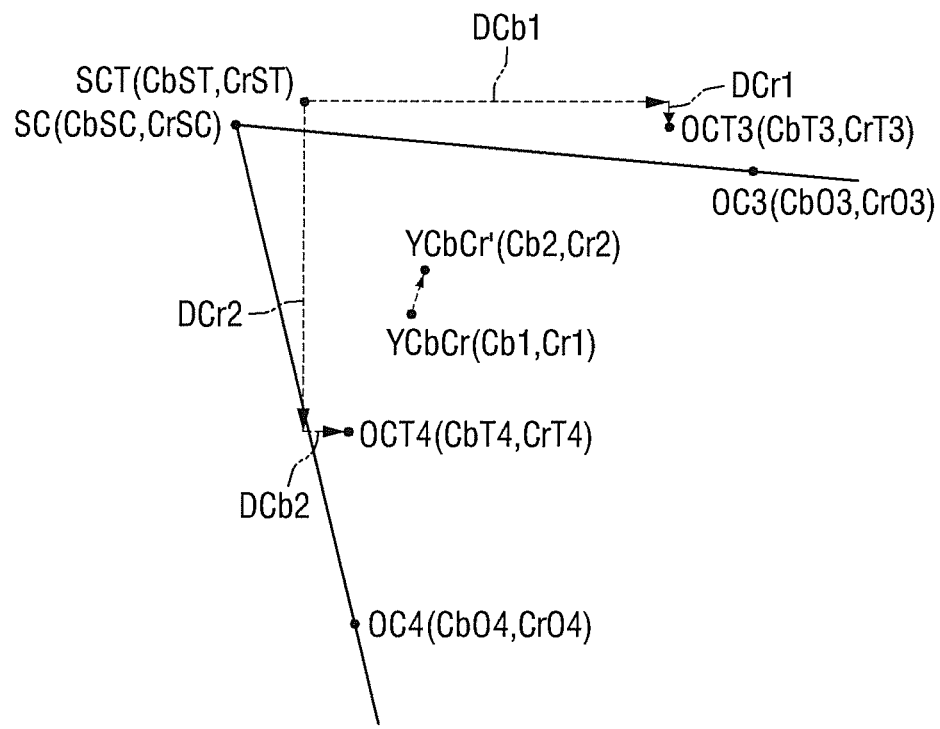
FIG. 7 is a diagram illustrating data conversion where the coordinates of the second image data are located in the third region of the CbCr-coordinate system, according to an embodiment of the present invention.

Data conversion where the coordinates of the second image data YCbCr are located in the third region R3 will now be described with reference to FIG. 7. FIG. 7 is a diagram illustrating data conversion where the coordinates of the second image data YCbCr are located in the third region R3 of the CbCr-coordinate system, according to an embodiment of the present invention.

Referring to FIG. 7, the second image data YCbCr may have coordinates of (Cb1, Cr1) in the CbCr-coordinate system, and (Cb1, Cr1) may be located in the third region R3. The second image data YCbCr is converted into the third image data YCbCr' having coordinates of (Cb2, Cr2). Cb2 and Cr2 may respectively correspond to Equations (1) and (2). Here, DCb1, DCb2, DCr1, DCr2, sc1, and sc2 may have different values from those in FIG. 5.

DCb1 may be a displacement from the coordinates (CbST, CrST) of the target reference color SCT to the coordinates (CbT3, CrT3) of the third target primary color OCT3 on the Cb axis. That is, DCb1=CbT3−CbST.

DCb2 may be a displacement from the coordinates (CbST, CrST) of the target reference color SCT to coordinates (CbT4, CrT4) of the fourth target primary color OCT4 on the Cb axis. That is, DCb2=CbT4−CbST.

DCr1 may be a displacement from the coordinates (CbST, CrST) of the target reference color SCT to the coordinates (CbT3, CrT3) of the third target primary color OCT3 on the Cr axis. That is, DCr1=CrT3−CrST.

DCr2 may be a displacement from the coordinates (CbST, CrST) of the target reference color SCT to the coordinates (CbT4, CrT4) of the fourth target primary color OCT4 on the Cr axis. That is, DCr2=CrT4−CrST.

In addition, sc1 and sc2 may be the first and second scaling factors, respectively. According to some embodiments of the present invention, if the coordinates (Cb1, Cr1) of the second image data YCbCr are the same as the coordinates (CbO3, CrO3) of the third primary color OC3, which are located in the counterclockwise direction of the third region R3 with respect to the coordinates (CbSC, CrSC) of the reference color SC, the values of sc1 and sc2 may be determined such that the coordinates (Cb1, Cr1) of the second image data YCbCr are converted into the coordinates (CbT3, CrT3) of the third target primary color OCT3 by Equations (1) and (2). The values of sc1 and sc2 may be given by $$sc1=|CbT3/[CbO3*(CbT3+CbT4-2CbST)]|$$

$$sc2=|CrT3/[CrO3*(CrT3+CrT4-2CrST)]|.$$

According to other embodiments of the present invention, if the coordinates (Cb1, Cr1) of the second image data YCbCr are the same as coordinates (CbO4, CrO4) of the fourth primary color OC4, which are located in the clockwise direction of the third region R3 with respect to the coordinates (CbSC, CrSC) of the reference color SC, the values of sc1 and sc2 may be determined such that the coordinates (Cb1, Cr1)

of the second image data YCbCr are converted into the coordinates (CbT4, CrT4) of the fourth target primary color OCT4 by Equations (1) and (2). The values of sc1 and sc2 may be given by $$sc1=|CbT4/[CbO4*(CbT3+CbT4-2CbST)]|$$

$$sc2=|CrT4/[CrO4*(CrT3+CrT4-2CrST)]|.$$

Figure 8:
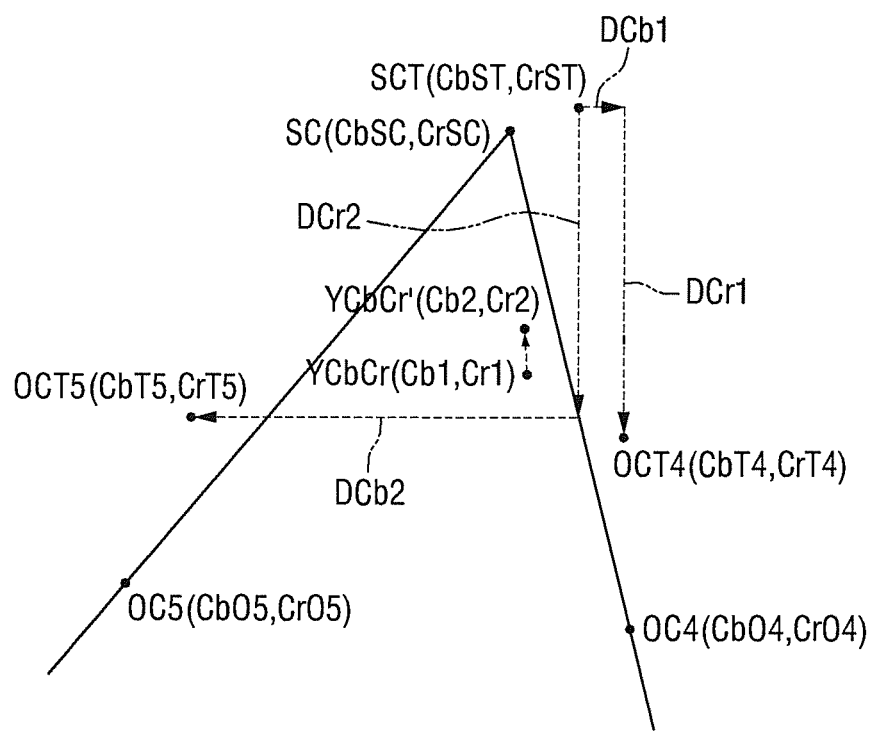
FIG. 8 is a diagram illustrating data conversion where the coordinates of the second image data are located in the fourth region of the CbCr-coordinate system, according to an embodiment of the present invention.

Data conversion where the coordinates of the second image data YCbCr are located in the fourth region R4 will now be described with reference to FIG. 8. FIG. 8 is a diagram illustrating data conversion where the coordinates of the second image data YCbCr are located in the fourth region R4 of the CbCr-coordinate system, according to an embodiment of the present invention.

Referring to FIG. 8, the second image data YCbCr may have coordinates of (Cb1, Cr1) in the CbCr-coordinate system, and (Cb1, Cr1) may be located in the fourth region R4. The second image data YCbCr is converted into the third image data YCbCr' having coordinates of (Cb2, Cr2). Cb2 and Cr2 may respectively correspond to Equations (1) and (2). Here, DCb1, DCb2, DCr1, DCr2, sc1, and sc2 may have different values from those in FIG. 5.

DCb1 may be a displacement from the coordinates (CbST, CrST) of the target reference color SCT to the coordinates (CbT4, CrT4) of the fourth target primary color OCT4 on the Cb axis. That is, DCb1=CbT4−CbST.

DCb2 may be a displacement from the coordinates (CbST, CrST) of the target reference color SCT to coordinates (CbT5, CrT5) of the fifth target primary color OCT5 on the Cb axis. That is, DCb2=CbT5−CbST.

DCr1 may be a displacement from the coordinates (CbST, CrST) of the target reference color SCT to the coordinates (CbT4, CrT4) of the fourth target primary color OCT4 on the Cr axis. That is, DCr1=CrT4−CrST.

DCr2 may be a displacement from the coordinates (CbST, CrST) of the target reference color SCT to the coordinates (CbT5, CrT5) of the fifth target primary color OCT5 on the Cr axis. That is, DCr2=CrT5−CrST.

In addition, sc1 and sc2 may be the first and second scaling factors, respectively. According to some embodiments of the present invention, if the coordinates (Cb1, Cr1) of the second image data YCbCr are the same as the coordinates (CbO4, CrO4) of the fourth primary color OC4, which are located in the counterclockwise direction of the fourth region R4 with respect to the coordinates (CbSC, CrSC) of the reference color SC, the values of sc1 and sc2 may be determined such that the coordinates (Cb1, Cr1) of the second image data YCbCr are converted into the coordinates (CbT4, CrT4) of the fourth target primary color OCT4 by Equations (1) and (2). The values of sc1 and sc2 may be given by $$sc1=|CbT4/[CbO4*(CbT4+CbT5-2CbST)]|$$

$$sc2=|CrT4/[CrO4*(CrT4+CrT5-2CrST)]|.$$

According to other embodiments of the present invention, if the coordinates (Cb1, Cr1) of the second image data YCbCr are the same as coordinates (CbO5, CrO5) of the fifth primary color OC5, which are located in the clockwise direction of the fourth region R4 with respect to the coordinates (CbSC, CrSC) of the reference color SC, the values of sc1 and sc2 may be determined such that the coordinates (Cb1, Cr1) of the second image data YCbCr are converted into the coordinates (CbT5, CrT5) of the fifth target primary color OCT5 by Equations (1) and (2). The values of sc1 and sc2 may be given by $$sc1=|CbT5/[CbO5*(CbT4+CbT5-2CbST)]|$$

$$sc2=|CrT5/[CrO5*(CrT4+CrT5-2CrST)]|.$$

Figure 9:
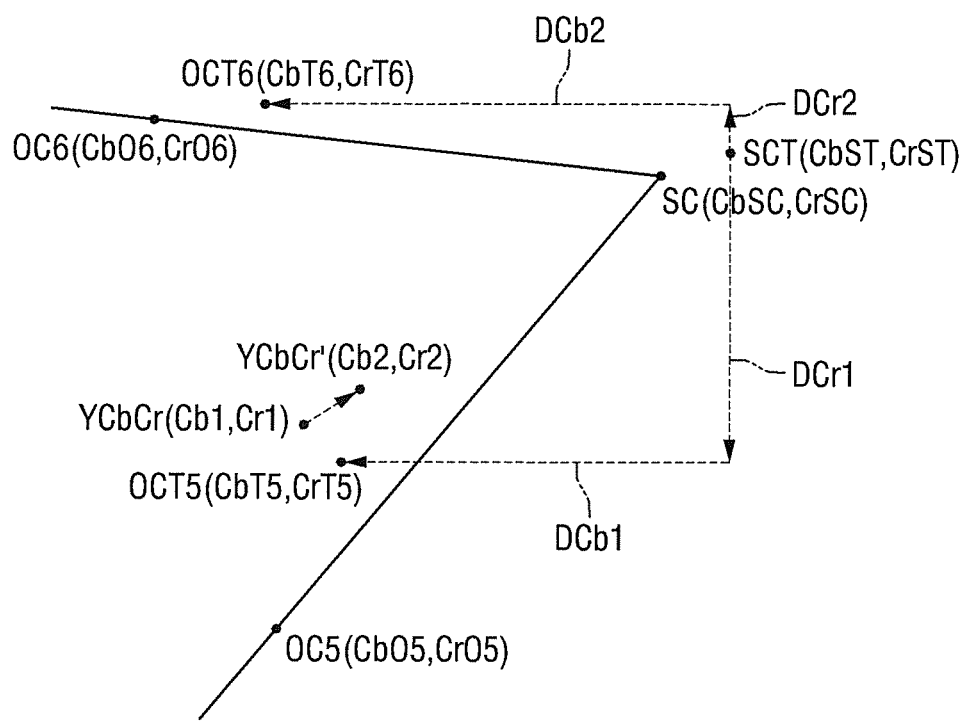
FIG. 9 is a diagram illustrating data conversion where the coordinates of the second image data are located in the fifth region of the CbCr-coordinate system, according to an embodiment of the present invention.

Data conversion where the coordinates of the second image data YCbCr are located in the fifth region R5 will now be described with reference to FIG. 9. FIG. 9 is a diagram illustrating data conversion where the coordinates of the second image data YCbCr are located in the fifth region R5 of the CbCr-coordinate system, according to an embodiment of the present invention.

Referring to FIG. 9, the second image data YCbCr may have coordinates of (Cb1, Cr1) in the CbCr-coordinate system, and (Cb1, Cr1) may be located in the fifth region R5. The second image data YCbCr is converted into the third image data YCbCr' having coordinates of (Cb2, Cr2). Cb2 and Cr2 may respectively correspond to Equations (1) and (2). Here, DCb1, DCb2, DCr1, DCr2, sc1, and sc2 may have different values from those in FIG. 5.

DCb1 may be a displacement from the coordinates (CbST, CrST) of the target reference color SCT to the coordinates (CbT5, CrT5) of the fifth target primary color OCT5 on the Cb axis. That is, DCb1=CbT5−CbST.

DCb2 may be a displacement from the coordinates (CbST, CrST) of the target reference color SCT to coordinates (CbT6, CrT6) of the sixth target primary color OCT6 on the Cb axis. That is, DCb2=CbT6−CbST.

DCr1 may be a displacement from the coordinates (CbST, CrST) of the target reference color SCT to the coordinates (CbT5, CrT5) of the fifth target primary color OCT5 on the Cr axis. That is, DCr1=CrT5−CrST.

DCr2 may be a displacement from the coordinates (CbST, CrST) of the target reference color SCT to the coordinates (CbT6, CrT6) of the sixth target primary color OCT6 on the Cr axis. That is, DCr2=CrT6−CrST.

In addition, sc1 and sc2 may be the first and second scaling factors, respectively. According to some embodiments of the present invention, if the coordinates (Cb1, Cr1) of the second image data YCbCr are the same as the coordinates (CbO5, CrO5) of the fifth primary color OC5, which are located in the counterclockwise direction of the fifth region R5 with respect to the coordinates (CbSC, CrSC) of the reference color SC, the values of sc1 and sc2 may be determined such that the coordinates (Cb1, Cr1) of the second image data YCbCr are converted into the coordinates (CbT5, CrT5) of the fifth target primary color OCT5 by Equations (1) and (2). The values of sc1 and sc2 may be given by $$sc1=|CbT5/[CbO5*(CbT5+CbT6-2CbST)]|$$

$$sc2=|CrT5/[CrO3*(CrT5+CrT6-2CrST)]|.$$

According to other embodiments of the present invention, if the coordinates (Cb1, Cr1) of the second image data YCbCr are the same as coordinates (CbO6, CrO6) of the sixth primary color OC6, which are located in the clockwise direction of the fifth region R5 with respect to the coordinates (CbSC, CrSC) of the reference color SC, the values of sc1 and sc2 may be determined such that the coordinates (Cb1, Cr1) of the second image data YCbCr are converted into the coordinates (CbT6, CrT6) of the sixth target primary color OCT6 by Equations (1) and (2). The values of sc1 and sc2 may be given by $$sc1=|CbT6/[CbO6*(CbT5+CbT6-2CbST)]|$$

$$sc2=|CrT6/[CrO6*(CrT5+CrT6-2CrST)]|.$$

Figure 10:
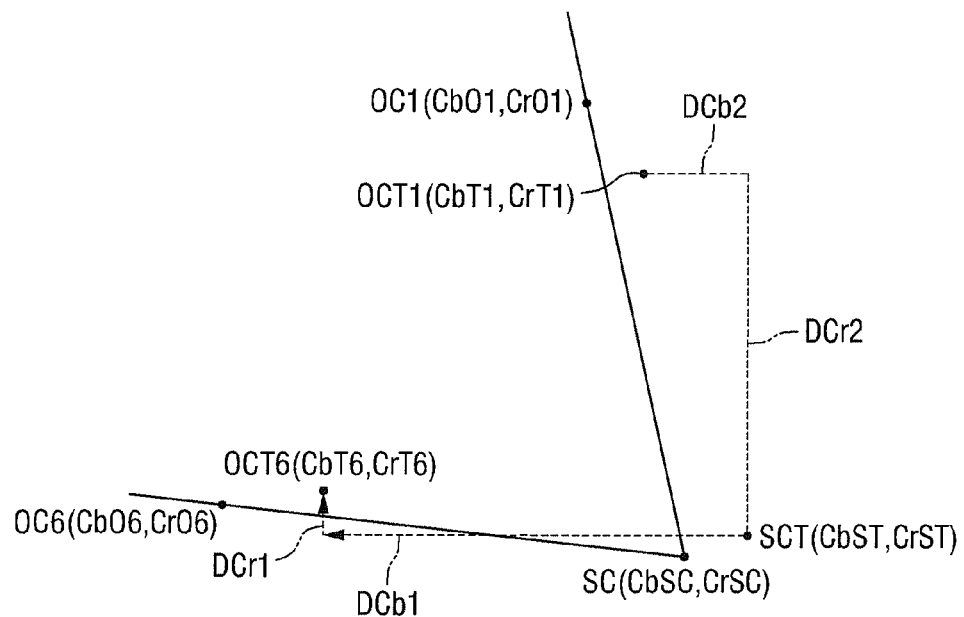
FIG. 10 is a diagram illustrating data conversion where the coordinates of the second image data are located in the sixth region of the CbCr-coordinate system, according to an embodiment of the present invention.

Data conversion where the coordinates of the second image data YCbCr are located in the sixth region R6 will now be described with reference to FIG. 10. FIG. 10 is a diagram illustrating data conversion where the coordinates of the second image data YCbCr are located in the sixth region R6 of the CbCr-coordinate system, according to an embodiment of the present invention.

Referring to FIG. 10, the second image data YCbCr may have coordinates of (Cb1, Cr1) in the CbCr-coordinate system, and (Cb1, Cr1) may be located in the sixth region R6. The second image data YCbCr is converted into the third image data YCbCr' having coordinates of (Cb2, Cr2). Cb2 and Cr2 may respectively correspond to Equations (1) and (2). Here, DCb1, DCb2, DCr1, DCr2, sc1, and sc2 may have different values from those in FIG. 5.

DCb1 may be a displacement from the coordinates (CbST, CrST) of the target reference color SCT to the coordinates (CbT6, CrT6) of the sixth target primary color OCT6 on the Cb axis. That is, DCb1=CbT6−CbST.

DCb2 may be a displacement from the coordinates (CbST, CrST) of the target reference color SCT to coordinates (CbT1, CrT1) of the first target primary color OCT1 on the Cb axis. That is, DCb2=CbT1−CbST.

DCr1 may be a displacement from the coordinates (CbST, CrST) of the target reference color SCT to the coordinates (CbT6, CrT6) of the sixth target primary color OCT6 on the Cr axis. That is, DCr1=CrT6−CrST.

DCr2 may be a displacement from the coordinates (CbST, CrST) of the target reference color SCT to the coordinates (CbT1, CrT1) of the first target primary color OCT1 on the Cr axis. That is, DCr2=CrT1−CrST.

In addition, sc1 and sc2 may be the first and second scaling factors, respectively. According to some embodiments of the present invention, if the coordinates (Cb1, Cr1) of the second image data YCbCr are the same as the coordinates (CbO6, CrO6) of the sixth primary color OC6, which are located in the counterclockwise direction of the sixth region R6 with respect to the coordinates (CbSC, CrSC) of the reference color SC, the values of sc1 and sc2 may be determined such that the coordinates (Cb1, Cr1) of the second image data YCbCr are converted into the coordinates (CbT6, CrT6) of the sixth target primary color OCT6 by Equations (1) and (2). The values of sc1 and sc2 may be given by $$sc1=|CbT6/[CbO6*(CbT6+CbT1-2CbST)]|$$

$$sc2=|CrT6/[CrO6*(CrT6+CrT1-2CrST)]|.$$

According to other embodiments of the present invention, if the coordinates (Cb1, Cr1) of the second image data YCbCr are the same as coordinates (CbO1, CrO1) of the first primary color OC1, which are located in the clockwise direction of the sixth region R6 with respect to the coordinates (CbSC, CrSC) of the reference color SC, the values of sc1 and sc2 may be determined such that the coordinates (Cb1, Cr1) of the second image data YCbCr are converted into the coordinates (CbT1, CrT1) of the first target primary color OCT1 by Equations (1) and (2). The values of sc1 and sc2 may be given by $$sc1=|CbT1/[CbO1*(CbT6+CbT1-2CbST)]|$$

$$sc2=|CrT1/[CrO1*(CrT6+CrT1-2CrST)]|.$$

Figure 11:
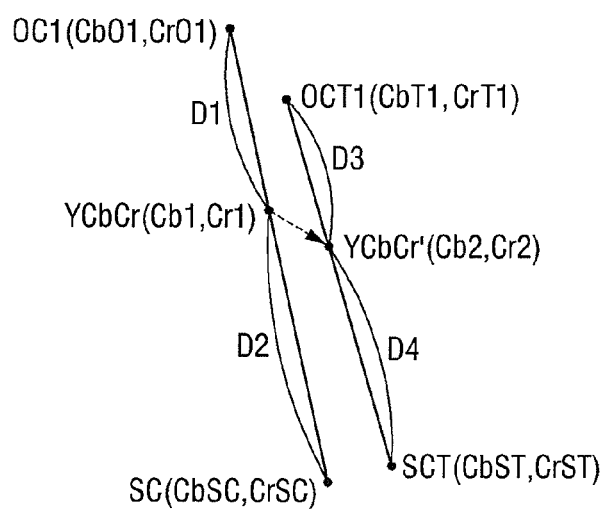
FIG. 11 is a diagram illustrating data conversion where the coordinates of the second image data are located on a straight line extending from the coordinates of the reference color to the coordinates of the first primary color in the CbCr-coordinate system, according to an embodiment of the present invention.

Data conversion where the coordinates (Cb1, Cr1) of the second image data YCbCr are located on a straight line extending from the coordinates (CbSC, CrSC) of the reference color SC to the coordinates (CbO1, CrO1) of the first primary color OC1 will now be described with reference to FIG. 11. FIG. 11 is a diagram illustrating data conversion where the coordinates (Cb1, Cr1) of the second image data YCbCr are located on a straight line extending from the coordinates (CbSC, CrSC) of the reference color SC to the coordinates (CbO1, CrO1) of the first primary color OC1 in the CbCr-coordinate system, according to an embodiment of the present invention.

Referring to FIG. 11, the coordinates (Cb1, Cr1) of the second image data YCbCr may be located on a straight line extending from the coordinates (CbSC, CrSC) of the reference color SC to the coordinates (CbO1, CrO1) of the first primary color OC1. A ratio of a distance D2 between the coordinates (Cb1, Cr1) of the second image data YCbCr and the coordinates (CbSC, CrSC) of the reference color SC to a distance D1 between the coordinates (Cb1, Cr1) of the second image data YCbCr and the coordinates (CbO1, CrO1) of the first primary color OC1 may be D2:D1. The coordinates (Cb2, Cr2) of the third image data YCbCr' may be located on a straight line extending from the coordinates (CbST, CrST) of the target reference color SCT to the coordinates (CbT1, CrT1) of the first target primary color OCT1. A ratio of a distance D4 between the coordinates (Cb2, Cr2) of the third image data YCbCr' and the coordinates (CbST, CrST) of the target reference color SCT to a distance D3 between the coordinates (Cb2, Cr2) of the third image data YCbCr' and the coordinates (CbT1, CrT1) of the first target primary color OCT1 may be D4:D3. Further, D2:D1=D4:D3. Therefore, Cb2 and Cr2 may be given by $$Cb2=(D1*CbSt+D2*CbT1)/(D1+D2)$$

$$Cr2=(D1*CrSt+D2*CrT1)/(D1+D2).$$

As described above with reference to FIGS. 3 through 11, the second converter 120 corrects colors by converting the second image data YCbCr into the third image data YCbCr', thereby reducing differences in color reproducibility of the image panel 500 and another display panel caused by differences (e.g., physical differences) between the display panels. Furthermore, the second convert 120 performs image data conversion in the CbCr-coordinate system, which is a 2D-coordinate system. Therefore, the second converter 120 can perform image data conversion more easily than when it performs image data conversion in a YCbCr-coordinate system, which is a 3D-coordinate system.

Figure 2:
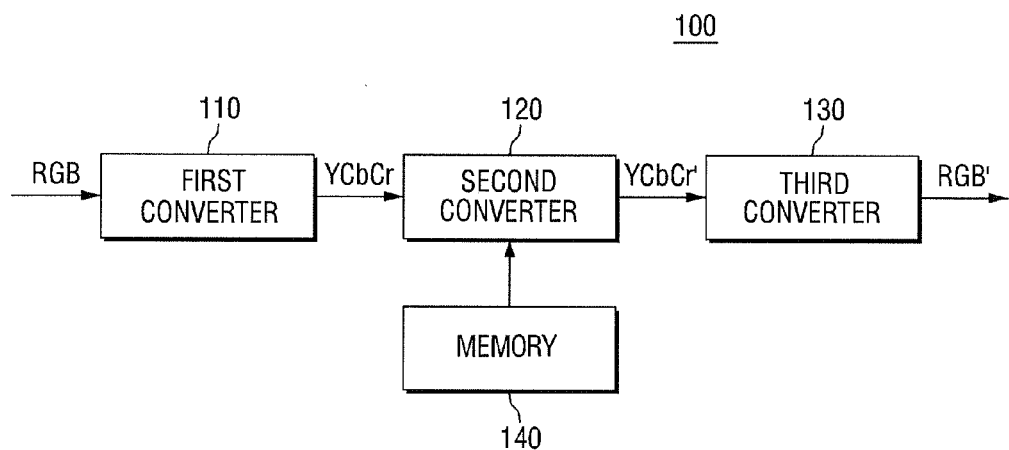
FIG. 2 is a block diagram of an image data converter according to an embodiment of the present invention.

Referring to FIG. 2, the third converter 130 may convert the third image data YCbCr' into the fourth image data RGB'. The fourth image data RGB' may be RGB-type image data. The third image data YCbCr' and the fourth image data RGB' may be of different types, but may represent substantially the same image.

The image data converter 100 may further include a memory 140. The memory 140 may store the coordinates of the first through sixth primary colors OC1 through OC6, the coordinates of the first through sixth target primary colors OCT1 through OCT6, the coordinates of the reference color SC, and the coordinates of the target reference color SCT. According to some embodiments of the present invention, the memory 140 may be omitted or placed outside the image data converter 100.

Embodiments of the present invention provide at least one of the following aspects:

a difference in color reproducibility caused by a difference between display panels can be compensated for; and an image data converting method used to compensate for a difference in color reproducibility caused by a difference between display panels can be provided.

However, the aspects of the present invention are not restricted to those set forth herein. The above and other aspects of the present invention will become more apparent to one of ordinary skill in the art to which the present invention pertains by referencing the claims.

What is claimed is:

1. A device comprising:
a first converter for converting first image data of an RGB-type into second image data of a YCbCr-type;
a second converter for converting the second image data into third image data of the YCbCr-type; and
a third converter for converting the third image data into fourth image data of the RGB-type,
wherein a CbCr-coordinate system having an X-axis corresponding to a Cb value and a Y-axis corresponding to a Cr value is divided into six regions by straight lines respectively extending from coordinates of a reference color to coordinates of six primary colors arranged in a clockwise direction around the coordinates of the reference color, the six primary colors comprising a first primary color and a second primary color successively arranged in the clockwise direction with respect to the coordinates of the reference color, and
wherein when coordinates of the second image data are located in a region having a boundary defined by straight lines respectively extending from the coordinates of the reference color to coordinates of the first primary color and to the coordinates of the second primary color, the coordinates of the second image data are determined by the coordinates of the reference color, the coordinates of the first primary color, the coordinates of the second primary color, coordinates of a target reference color corresponding to the coordinates of the reference color, coordinates of a first target primary color corresponding to the coordinates of the first primary color, and coordinates of a second target primary color corresponding to the coordinates of the second primary color.

2. The device of claim 1, further comprising a memory for storing the coordinates of the first and second primary colors, the coordinates of the first and second target primary colors, and the coordinates of the target reference color.

3. The device of claim 1, wherein the reference color is white, and wherein the six primary colors comprise red, magenta, blue, cyan, green, and yellow.

4. The device of claim 1, wherein when the coordinates of the second image data are the same as the coordinates of the reference color, the coordinates of the third image data are the same as the coordinates of the target reference color.

5. The device of claim 1, wherein when the coordinates of the second image data are the same as the coordinates of the first primary color, the coordinates of the third image data are the same as the coordinates of the first target primary color.

6. The device of claim 1, wherein when the coordinates of the second image data are located on a straight line extending from the coordinates of the reference color to the coordinates of the first primary color, a ratio of a second distance between the coordinates of the second image data and the coordinates of the reference color to a first distance between the coordinates of the second image data and the coordinates of the first primary color is equal to a ratio of a fourth distance between the coordinates of the third image data and the coordinates of the target reference color to a third distance between the coordinates of the third image data and the coordinates of the first target primary color.

7. The device of claim 1, wherein:
the coordinates of the second image data are (Cb1, Cr1);
the coordinates of the third image data are (Cb2, Cr2);
a displacement from the coordinates of the target reference color to the coordinates of the first target primary color on a Cb-axis is DCb1;
a displacement from the coordinates of the target reference color to the coordinates of the first target primary color on a Cr-axis is DCr1;
a displacement from the coordinates of the target reference color to the coordinates of the second target primary color on the Cb-axis is DCb2;
a displacement from the coordinates of the target reference color to the coordinates of the second target primary color on the Cr-axis is DCr2;
sc1 and sc2 are first and second scaling factors, respectively;
the coordinates of the second image data are located in the region having a boundary defined by straight lines respectively extending from the coordinates of the reference color to the coordinates of the first primary color and to the coordinates of the second primary color;

$Cb1=Cb1*(DCb1+DCb2)*sc1$; and $Cr2=Cr1*(DCr1+DCr2)*sc2$.

8. The device of claim 7, wherein:
the coordinates of the first target primary color are (CbT1, CrT1), wherein T1 refers to the first target primary color;
the coordinates of the second target primary color are (CbT2, CrT2), wherein T2 refers to the second target primary color;
the coordinates of the first primary color are (CbO1, CrO1), wherein O1 refers to the first primary color;
the coordinates of the target reference color are (CbST, CrST), wherein ST refers to the target reference color;

$sc1=|CbT1/[CbO1*(CbT1+CbT2-2CbST)]|$; and $sc2=|CrT1/[CbO1*(CrT1+CrT2-2CrST)]|$.

9. The device of claim 7, wherein:
the coordinates of the first target primary color are (CbT1, CrT1), wherein T1 refers to the first target primary color;
the coordinates of the second target primary color are (CbT2, CrT2), wherein T2 refers to the second target primary color;
the coordinates of the second primary color are (CbO2, CrO2), wherein O2 refers to the second primary color;
the coordinates of the target reference color are (CbST, CrST), wherein ST refers to the target reference color;

$sc1=|CbT2/[CbO2*(CbT1+CbT2-2CbST)]|$; and $sc2|CrT2/[CrO2*(CrT1+CrT2-2CrST)]|$.

10. A display device comprising:
an image data converter for converting first image data of an RGB-type into fourth image data of the RGB-type, the image data converter comprising:
a first converter for converting the first image data of the RGB-type into second image data of a YCbCr-type;
a second converter for converting the second image data into third image data of the YCbCr-type; and
a third converter for converting the third image data into the fourth image data of the RGB-type;
a display panel for displaying an image corresponding to the fourth image data,
wherein a CbCr-coordinate system having an X-axis corresponding to a Cb value and a Y-axis corresponding to a Cr value is divided into six regions respectively defined by straight lines respectively extending from coordinates of a reference color to coordinates of six primary colors arranged in a clockwise direction around the coordinates of the reference color, wherein the six primary colors comprise a first primary color and a second primary color successively arranged in the clockwise direction with respect to the coordinates of the reference color, and wherein when coordinates of the second image data are located in a region having a boundary defined by straight lines respectively extending from the coordinates of the reference color to coordinates of the first primary color and to the coordinates of the second primary color, the coordinates of the second image data are determined by:

the coordinates of the reference color;
the coordinates of the first primary color;
the coordinates of the second primary color;
coordinates of a target reference color corresponding to the coordinates of the reference color;
coordinates of a first target primary color corresponding to the coordinates of the first primary color; and
coordinates of a second target primary color corresponding to the coordinates of the second primary color.

11. The display device of claim 10, wherein:
the coordinates of the second image data are (Cb1, Cr1);
coordinates of the third image data are (Cb2, Cr2);
a displacement from the coordinates of the target reference color to the coordinates of the first target primary color on a Cb-axis is DCb1;
a displacement from the coordinates of the target reference color to the coordinates of the first target primary color on a Cr-axis is DCr1;
a displacement from the coordinates of the target reference color to the coordinates of the second target primary color on the Cb-axis is DCb2;
a displacement from the coordinates of the target reference color to the coordinates of the second target primary color on the Cr-axis is DCr2;
sc1 and sc2 are first and second scaling factors, respectively;
the coordinates of the second image data are located in the region having a boundary defined by the straight lines respectively extending from the coordinates of the reference color to the coordinates of the first primary color and to the coordinates of the second primary color;

$Cb2=Cb1*(DCb1+DCb2)*sc1$; and $Cr2=Cr1*(DCr1+DCr2)*sc2$.

12. The display device of claim 11, wherein:
the coordinates of the first target primary color are (CbT1, CrT1), wherein T1 refers to the first target primary color;
the coordinates of the second target primary color are (CbT2, CrT2), wherein T2 refers to the second target primary color;
the coordinates of the first primary color are (CbO1, CrO1), wherein O1 refers to the first primary color;
the coordinates of the target reference color are (CbST, CrST), wherein ST refers to the target reference color;

$sc1=|CbT1/[CbO1*(CbT1+CbT2-2CbST)]|$; and $sc2=|CrT1/[CrO1*(CrT1+CrT2-2CrST)]|$.

13. The display device of claim 10, wherein when the coordinates of the second image data are the same as the coordinates of the reference color, the coordinates of the third image data are the same as the coordinates of the target reference color.

14. The display device of claim 10, wherein when the coordinates of the second image data are the same as the coordinates of the first primary color, the coordinates of the third image data are the same as the coordinates of the first target primary color.

15. The display device of claim 10, wherein when the coordinates of the second image data are located on a straight line extending from the coordinates of the reference color to the coordinates of the first primary color, a ratio of a second distance between the coordinates of the second image data and the coordinates of the reference color to a first distance between the coordinates of the second image data and the coordinates of the first primary color is equal to a ratio of a fourth distance between the coordinates of the third image data and the coordinates of the target reference color to a third distance between the coordinates of the third image data and the coordinates of the first target primary color.

16. The display device of claim 10, further comprising a memory for storing the coordinates of the first and second primary colors, the coordinates of the first and second target primary colors, and the coordinates of the target reference color.

17. The display device of claim 10, wherein the reference color is white, and wherein the six primary colors comprise red, magenta, blue, cyan, green, and yellow.

18. The display device of claim 17, wherein:
the coordinates of the first target primary color are (CbT1, CrT1), wherein T1 refers to the first target primary color;
the coordinates of the second target primary color are (CbT2, CrT2), wherein T2 refers to the second target primary color;
the coordinates of the second primary color are (CbO2, CrO2), wherein O2 refers to the second primary color;
the coordinates of the target reference color are (CbST, CrST), wherein ST refers to the target reference color;

$sc1=|CbT2/[CbO2*(CbT1+CbT2-2CbST)]|$; and $sc2=|CrT2/[CrO2*(CrT1+CrT2-2CrST)]|$.

19. The display device of claim 10, wherein when coordinates of YCbCr-type data into which the fourth image data is converted are the same as the coordinates of the first target primary color in the CbCr-coordinate system, the display panel displays the first primary color.

20. The display device of claim 10, wherein when the coordinates of the third image data of the YCbCr-type into which the fourth image data is converted are the same as the coordinates of the target reference color, the display panel displays the reference color.

* * * * *